US012366460B2

(12) United States Patent
Bailey et al.

(10) Patent No.: US 12,366,460 B2
(45) Date of Patent: Jul. 22, 2025

(54) SYSTEMS AND METHODS FOR CREATING AND MANAGING WAYAREAS

(71) Applicant: Navico, Inc., Tulsa, OK (US)

(72) Inventors: Paul Robert Bailey, Auckland (NZ); Aska Lai, Auckland (NZ)

(73) Assignee: Navico, Inc., Tulsa, OK (US)

( * ) Notice: Subject to any disclaimer, the term of this patent is extended or adjusted under 35 U.S.C. 154(b) by 251 days.

(21) Appl. No.: 18/173,245

(22) Filed: Feb. 23, 2023

(65) Prior Publication Data

US 2024/0288278 A1 Aug. 29, 2024

(51) Int. Cl.
G01C 21/00 (2006.01)
G01C 21/20 (2006.01)

(52) U.S. Cl.
CPC ........ G01C 21/3811 (2020.08); G01C 21/203 (2013.01)

(58) Field of Classification Search
CPC .......................... G01C 21/3811; G01C 21/203
See application file for complete search history.

(56) References Cited

U.S. PATENT DOCUMENTS

| | | | |
|---|---|---|---|
| 9,135,731 B2 | 9/2015 | Lauenstein et al. | |
| 9,442,956 B2 | 9/2016 | Konig et al. | |
| 9,986,197 B2 | 5/2018 | Gaynor | |
| 10,200,823 B2 | 2/2019 | Laster et al. | |
| 10,251,382 B2 | 4/2019 | Bailey | |
| 10,948,577 B2 | 3/2021 | Snyder | |
| 2015/0205865 A1 | 7/2015 | Wang et al. | |
| 2017/0168800 A1 | 6/2017 | Isaacson et al. | |
| 2019/0251719 A1* | 8/2019 | Wang | H04W 4/026 |

FOREIGN PATENT DOCUMENTS

| | | |
|---|---|---|
| CN | 113269670 A | 8/2021 |
| EP | 4067822 A1 | 10/2022 |

OTHER PUBLICATIONS

Examination Report dated Jan. 13, 2025 issued in Australian Application No. 2024200842.

* cited by examiner

Primary Examiner — Brian P Sweeney
(74) Attorney, Agent, or Firm — Nelson Mullins Riley & Scarborough LLP

(57) ABSTRACT

Systems and methods are provided herein for creating and displaying wayareas on a screen. A system includes a memory and a processor, and the processor is configured to retrieve a plurality of waypoints from the memory. Each of the plurality of waypoints is associated with a location and one or more waypoint characteristics, which include at least one of weather data, season data, time of day data, tide data or depth data. The plurality of waypoints are presented on the screen and a desired set of waypoints are determined based on either a filtering process or user input. A wayarea is created from the desired set of waypoints and then saved to the memory. The system also displays a plurality of wayareas on the screen, each as highlighted shapes, and the plurality of wayareas may be filtered based on certain characteristics.

17 Claims, 11 Drawing Sheets

SYSTEMS AND METHODS FOR CREATING AND MANAGING WAYAREAS

FIELD

Example embodiments herein generally relate to wayareas and, more particularly to, creating and managing wayareas to aid a user in navigation and other activities in a marine environment.

BACKGROUND

Many watercraft have marine electronic devices with systems that save waypoints in memory to enable a user, for example, to return to a certain location for a certain purpose. Some systems enable a user to mark a location on a chart or map, as that location to the user may be ideal for an activity, such as fishing. Waypoints may become numerous over time, however, especially for users that save waypoints on a regular basis. For example, in some cases, a user's waypoints can become so numerous that the user is no longer able to efficiently locate desirable waypoints, including deciphering information from a chart with the waypoints shown overtop. Further, having a plurality of waypoints that are each relevant only in certain scenarios can be confusing to a user, no matter how many or few waypoints are available. Thus, a need exists for a system or method for managing waypoints created by a user on a marine electronic device.

BRIEF SUMMARY

Various example embodiments contemplate forming areas on a chart that are associated with characteristics that are useful for a user. In this regard, some example embodiments enable formation of an area (e.g., a wayarea) that covers one or more waypoints that have previously been created by a user. In this way, like waypoints can be grouped and are more easily selectable and usable—e.g., as a wayarea. Notably, however, wayareas may be formed in other ways, such as by a user drawing or otherwise indicating an area and providing one or more wayarea characteristics to be associated therewith. Use of wayareas instead of waypoints removes the clutter of waypoints and also clues the user into a general area on the body of water that matches their desired criteria and/or activity (e.g., fishing, trolling, drifting, etc.). The wayareas may be presented on the chart in a form that is readily discernable by the user, such as being highlighted on the chart (which may include, for example, being presented in one or more of transparent form, partial transparent form, patterned form, colored form, outlined form, among other highlighting display capabilities). In some embodiments, different highlighting may be applied to presented wayareas depending on, for example, filtered characteristics of wayareas (e.g., time of day, type of fish, etc.).

Some example embodiments of the present invention include systems for creating wayareas for a watercraft. In some embodiments, systems are provided that retrieve a plurality of waypoints from a memory. Each of the plurality of waypoints may be associated with a location and one or more waypoint characteristics. For example, the one or more waypoint characteristics may include weather data, season data, time of day data, tide data, and/or depth data, among other types of data. The systems may then cause presentation of at least some of the plurality of waypoints on a screen and determine, based on user input, a set of desired waypoints from the plurality of waypoints. This determination may be made by filtering the plurality of waypoints based on one or more filtering characteristics, which may be selected by a user or automatically. Alternatively, a user may select the set of desired waypoints. Once the set of desired waypoints have been determined, such systems may generate a wayarea using the set of desired waypoints. The wayarea may establish a location area that includes the locations of each of the waypoints within the set of desired waypoints. Further, the wayarea may establish a set of wayarea characteristics, which may be one or more characteristics that are shared by each of the set of desired waypoints that were used to generate the wayarea. Once the wayarea has been created, such systems may save the wayarea in the memory.

Some other example embodiments include systems for displaying wayareas on a screen for a watercraft. In some embodiments, systems are provided that retrieve a plurality of wayareas from a memory. Each of the plurality of wayareas may be associated with a location area and one or more wayarea characteristics. For example, the one or more wayarea characteristics may include weather data, season data, time of day data, tide data, and/or depth data, among other types of data. The systems may then cause presentation of at least some of the plurality of wayareas on the screen. For example, one or more wayareas may each be displayed as a highlighted shape overtop a chart at positions on the chart that correspond to the relative location areas of each of the one or more wayareas. Further, the one or more wayareas that are displayed on the chart may be filtered based on the one or more wayarea characteristics.

In an example embodiment, a system is provided for forming wayareas for a watercraft. The system includes a screen, a processor, and a memory including computer executable instructions. The computer executable instructions are configured to, when executed by the processor, cause the processor to retrieve a plurality of waypoints from the memory. Each of the plurality of waypoints is associated with a location and one or more waypoint characteristics. The one or more waypoint characteristics include at least one of weather data corresponding to weather conditions associated with the waypoint, season data corresponding to a season associated with the waypoint, time of day data corresponding to one or more times of day associated with the waypoint, tide data corresponding to tide conditions associated with the waypoint, or depth data corresponding to a depth of a bottom surface at the location of the waypoint. The computer executable instructions are also configured to, when executed by the processor, cause the processor to cause presentation of at least some of the plurality of waypoints on the screen and determine, based on a first user input indicating a desire to form a wayarea, a set of waypoints from the plurality of waypoints based on at least one of filtering the plurality of waypoints to determine the set of waypoints within the plurality of waypoints having one or more filtering characteristics, or second user input selecting each waypoint in the set of waypoints. The computer executable instructions are also configured to, when executed by the processor, cause the processor to generate the wayarea formed from the determined set of waypoints. The wayarea establishes a location area that includes all of the locations of each of the waypoints within the determined set of waypoints. The computer executable instructions are also configured to, when executed by the processor, cause the processor to save the wayarea in the memory.

In some embodiments, the one or more filtering characteristics may include at least one of the weather data, the season data, the time of day data, the tide data, or the depth data.

In some embodiments, the one or more filtering characteristics may be determined based on a third user input.

In some embodiments, the one or more filtering characteristics may be determined based on current conditions, and the current conditions may be determined by collecting information from at least one of a sensor, a database, or a server.

In some embodiments, the one or more filtering characteristics may be determined based on a selected type of fishing.

In some embodiments, the generated wayarea may be stored in the memory in a manner that associates at least some of the one or more waypoint characteristics of each of the waypoints within the determined set of waypoints with the wayarea.

In some embodiments, the set of waypoints that is determined from the plurality of waypoints may have a relative distance to each other that satisfies a predetermined threshold.

In some embodiments, the predetermined threshold may be 200 feet or less.

In some embodiments, the processor may be further configured to display the wayarea on the screen overtop a chart.

In some embodiments, weather data may include at least one of cloud data, sun data, moon data, precipitation data, or temperature data.

In some embodiments, the weather conditions may be desirable weather conditions corresponding to an activity.

In some embodiments, the weather conditions may be captured conditions when the waypoint was generated.

In some embodiments, the second user input selecting the waypoints may include user input indicating a hand drawn shape overtop a chart, and the set of waypoints that is determined may each have location data corresponding to locations within the hand drawn shape on the chart.

In another example embodiment, a method is provided for forming wayareas for a watercraft. The method includes retrieving a plurality of waypoints from a memory. Each of the plurality of waypoints is associated with a location and one or more waypoint characteristics, and the one or more waypoint characteristics include at least one of weather data corresponding to weather conditions associated with the waypoint, season data corresponding to a season associated with the waypoint, time of day data corresponding to one or more times of day associated with the waypoint, tide data corresponding to tide conditions associated with the waypoint, or depth data corresponding to a depth of the bottom surface at the location of the waypoint. The method also includes causing presentation of at least some of the plurality of waypoints on the screen and determining, based on a first user input indicating a desire to form a wayarea, a set of waypoints from the plurality of waypoints based on at least one of filtering the plurality of waypoints to determine the set of waypoints within the plurality of waypoints having one or more filtering characteristics, or second user input selecting each waypoint in the set of waypoints. The method also includes generating the wayarea formed from the determined set of waypoints. The wayarea establishes a location area that includes all of the locations of each of the waypoints within the determined set of waypoints. The method also includes saving the wayarea in the memory.

In some embodiments, the one or more filtering characteristics may include at least one of the weather data, the season data, the time of day data, the tide data, or the depth data.

In some embodiments, the one or more filtering characteristics may be determined based on a third user input.

In some embodiments, the one or more filtering characteristics may be determined based on current conditions, and the current conditions may be determined by collecting data from at least one of a sensor, a database, or a server.

In some embodiments, the one or more filtering characteristics may be determined based on a selected type of fishing.

In some embodiments, the second user input selecting the waypoints may include user input indicating a hand drawn shape overtop a chart, and the set of waypoints that is determined may each have location data corresponding to locations within the hand drawn shape on the chart.

In another example embodiment, a non-transitory computer readable medium is provided. The non-transitory computer readable medium has stored thereon computer instructions that, when executed by a processor, cause the processor to retrieve a plurality of waypoints from a memory. Each of the plurality of waypoints is associated with a location and one or more waypoint characteristics, and the one or more waypoint characteristics include at least one of weather data corresponding to weather conditions associated with the waypoint, season data corresponding to a season associated with the waypoint, time of day data corresponding to one or more times of day associated with the waypoint, tide data corresponding to tide conditions associated with the waypoint, or depth data corresponding to a depth of the bottom surface at the location of the waypoint. The non-transitory computer readable medium also has stored thereon computer instructions that, when executed by a processor, cause the processor to cause presentation of at least some of the plurality of waypoints on the screen and determine, based on a first user input indicating a desire to form a wayarea, a set of waypoints from the plurality of waypoints based on at least one of filtering the plurality of waypoints to determine the set of waypoints within the plurality of waypoints having one or more filtering characteristics, or second user input selecting each waypoint in the set of waypoints. The non-transitory computer readable medium also has stored thereon computer instructions that, when executed by a processor, cause the processor to generate the wayarea formed from the determined set of waypoints. The wayarea establishes a location area that includes all of the locations of each of the waypoints within the determined set of waypoints. The non-transitory computer readable medium also has stored thereon computer instructions that, when executed by a processor, cause the processor to save the wayarea in the memory.

In another example embodiment, a system is provided for displaying wayareas on a screen of a marine electronic device. The system includes the screen, a processor, and a memory including computer executable instructions. The computer executable instructions are configured to, when executed by the processor, cause the processor to retrieve one or more wayareas from the memory. Each of the one or more wayareas is associated with a location area and one or more wayarea characteristics, and the one or more wayarea characteristics include at least one of weather data corresponding to weather conditions associated with the wayarea, season data corresponding to a season associated with the wayarea, time of day data corresponding to one or more times of day associated with the wayarea, tide data corresponding to tide conditions associated with the wayarea, or depth data corresponding to a depth of a bottom surface at the location area of the wayarea. The computer executable instructions are also configured to, when executed by the processor, cause the processor to cause presentation of the one or more wayareas on the screen overtop a chart. Each of the one or more wayareas is displayed as a highlighted shape overtop the chart at positions on the chart that correspond to the relative location areas of each of the one or more wayareas.

In some embodiments, the processor may be further configured to determine, based on a first user input indicating a desire to display a wayarea, one or more desired wayareas from the one or more wayareas based on filtering the one or more wayareas to determine which of the one or more wayareas has one or more filtering characteristics.

In some embodiments, the one or more filtering characteristics may be determined based on one or more current conditions.

In some embodiments, the processor may be further configured to determine, based on a first user input indicating a desire to display a wayarea, one or more desired wayareas from the one or more wayareas based on second user input selecting the one or more desired wayareas.

In some embodiments, the one or more desired wayareas may be depicted as one or more shapes highlighting one or more areas of the chart.

In some embodiments, the processor may be further configured to cause the one or more desired wayareas to be depicted in at least one of different colors, different patterns, or different appearances based on different wayareas having different values of a same wayarea characteristic.

In some embodiments, a first wayarea of the one or more desired wayareas may be depicted in a first type of highlighting in an instance in which one or more wayarea characteristics of the first wayarea match the one or more current conditions, and a second wayarea of the one or more desired wayareas may be depicted in a second type of highlighting in an instance in which one or more wayarea characteristics of the second wayarea do not match the one or more current conditions.

In some embodiments, the first wayarea may be depicted in green in a first level of transparency, and the second wayarea may be depicted in red in a second level of transparency.

In another example embodiment, a method is provided for displaying wayareas on a screen of a marine electronic device. The method includes retrieving one or more wayareas from a memory. Each of the one or more wayareas is associated with a location area and one or more wayarea characteristics, and each of the one or more wayarea characteristics include at least one of weather data corresponding to weather conditions associated with the wayarea, season data corresponding to a season associated with the wayarea, time of day data corresponding to one or more times of day associated with the wayarea, tide data corresponding to tide conditions associated with the wayarea, or depth data corresponding to a depth of a bottom surface at the location area of the wayarea. The method also includes causing presentation of the one or more wayareas on the screen overtop a chart. Each of the one or more wayareas is displayed as a highlighted shape overtop the chart at positions on the chart that correspond to the relative location areas of each of the one or more wayareas.

In another example embodiment, a non-transitory computer readable medium is provided. The non-transitory computer readable medium has stored thereon computer instructions that, when executed by a processor, cause the processor to retrieve one or more wayareas from a memory. Each of the one or more wayareas is associated with a location area and one or more wayarea characteristics, and each of the one or more wayarea characteristics include at least one of weather data corresponding to weather conditions associated with the wayarea, season data corresponding to a season associated with the wayarea, time of day data corresponding to one or more times of day associated with the wayarea, tide data corresponding to tide conditions associated with the wayarea, or depth data corresponding to a depth of a bottom surface at the location area of the wayarea. The non-transitory computer readable medium also has stored thereon computer instructions that, when executed by a processor, cause the processor to cause presentation of the one or more wayareas on the screen overtop a chart. Each of the one or more wayareas is displayed as a highlighted shape overtop the chart at positions on the chart that correspond to the relative location areas of each of the one or more wayareas.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Figure 1:
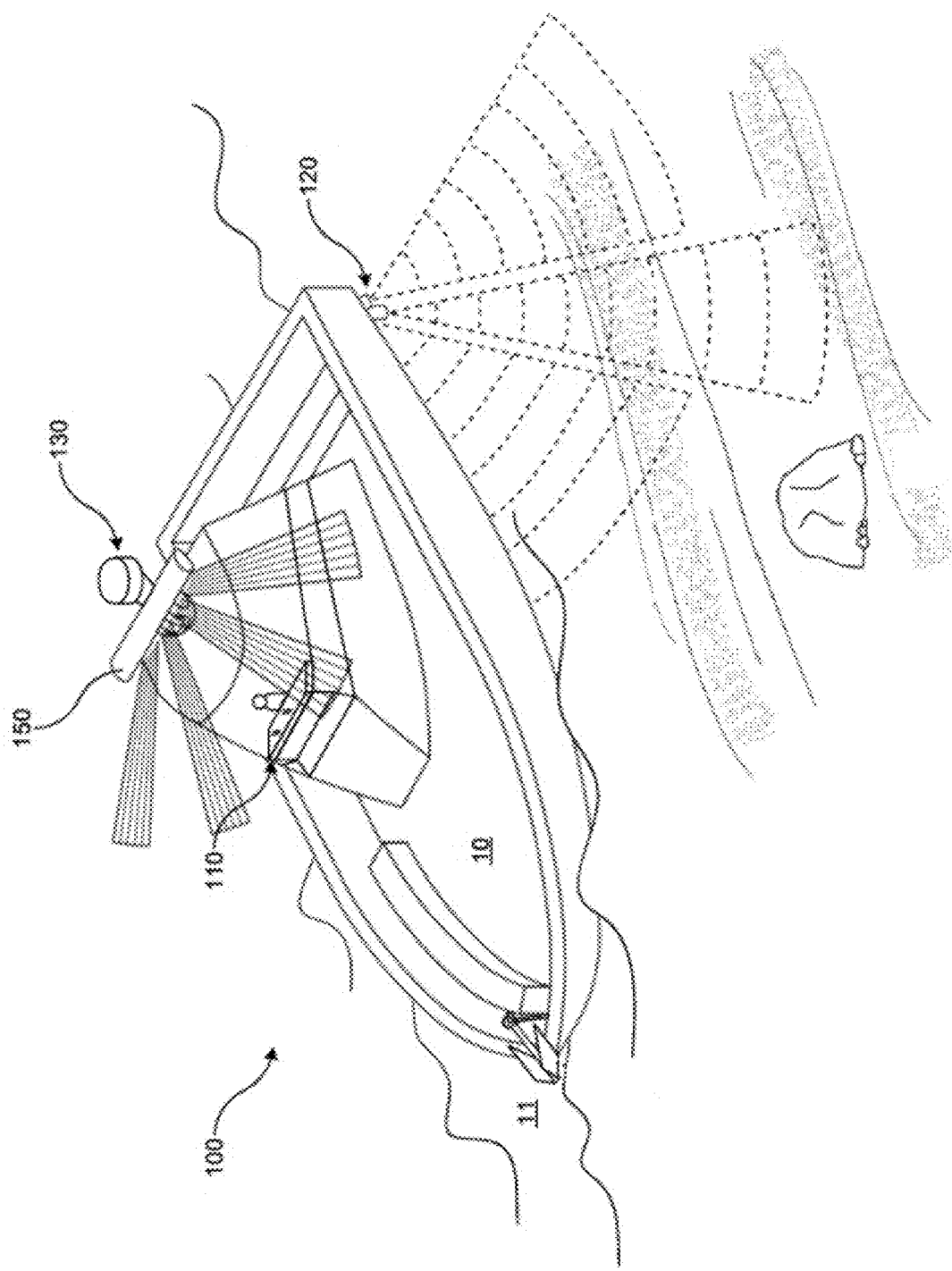
FIG. 1 illustrates an example marine vessel, in accordance with some embodiments discussed herein.

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present disclosure provide systems and methods for creating and managing wayareas for a marine vessel (e.g., watercraft, boat, ship). Such example embodiments enable a user to better understand and navigate an environment with changing conditions. This provides advantages in convenience and accessibility. For example, a user may not have to be an experienced boater in order to determine an ideal strategy for a desired activity (e.g., fishing, diving, etc.). Further, removal of clutter of too many waypoints may simplify the display and enable easier use, which may be particularly beneficial when a user is trying to figure out where to go while being focused on other marine activities (e.g., navigating, fishing, etc.).

FIG. 1 illustrates an example marine vessel 10 on a body of water 11 in connection with various system embodiments described herein. An example system 100 may include a display 110 (e.g., marine electronics device at the helm of the marine vessel 10), a marine system 120 (e.g., a sonar system), a navigation system 130 for determining the current location of the marine vessel 10, a sensing system for determining current conditions, and/or one or more marine devices (e.g., radar system 150, propulsion system used for propulsion and/or steering).

Figure 9:
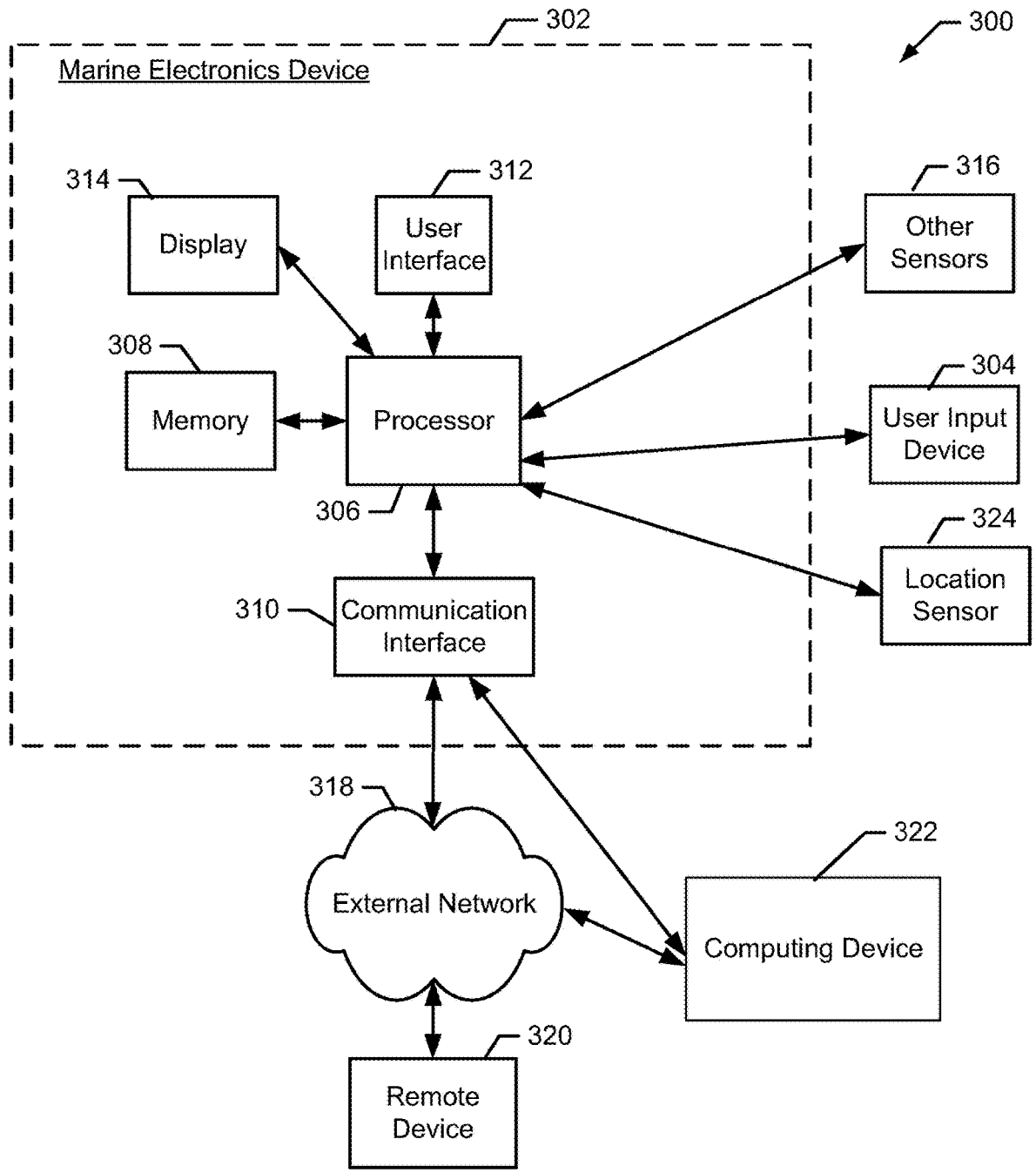
FIG. 9 is a block diagram of an example marine system, in accordance with some embodiments discussed herein.

In some embodiments, the system 100 may include a controller (e.g., marine electronics device, processor, computer, marine electronics hub) onboard or otherwise associated with the marine vessel 10, as shown in the schematic diagram of FIG. 9. The controller may be configured to control operations of one or more marine devices (e.g., sonar system 120, propulsion system, radar system 150, marine display 110, navigation system 130, etc.). The controller may be in communication with one or more sensor modules (e.g., via wired and/or wireless connections). The sensor module may transmit signals to the controller indicating a detected condition, event, and/or user input.

In some embodiments, the controller may be an assembly or system of multiple processors and/or circuitry distributed across various devices. As such, actions taken by the controller (e.g., determining, transmitting, receiving, generating, comparing) may each occur on different devices or using multiple components.

Using systems such as system 100, users create waypoints for a watercraft for various reasons. For example, a user may create a waypoint to mark a location after finding fish (or some other desired finding) at a certain point in time. Over time, users create numerous waypoints as they discover different desired locations. The result is a chart that is filled with a plurality of waypoints that are difficult to interpret. For example, a plurality of waypoints can look like a mass of unrelated information to a user, while the plurality of waypoints is actually a mass of information that the user needs/wants to decipher. Even experienced users have difficulty differentiating areas once a chart is filled with waypoints.

Figure 2:
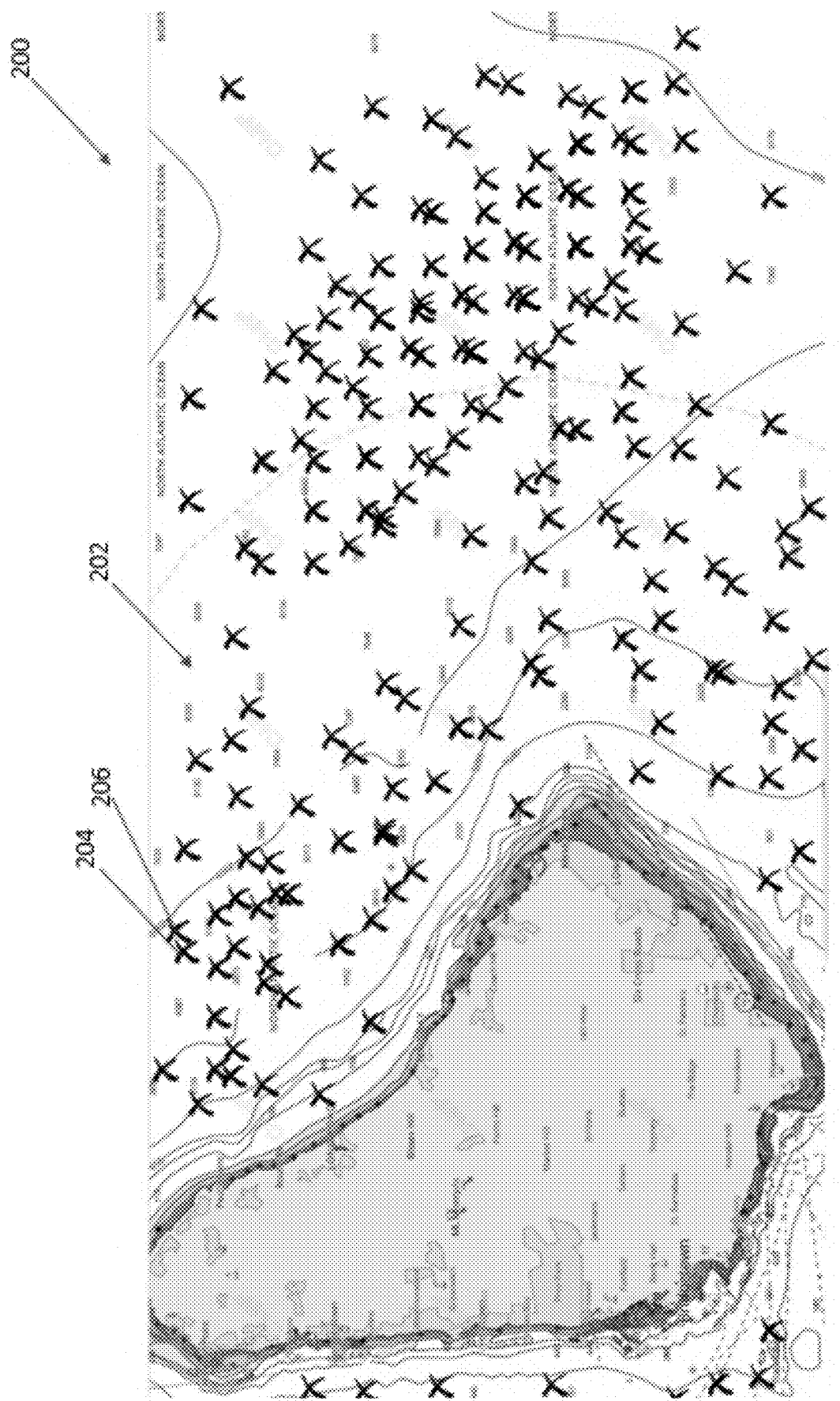
FIG. 2 shows an example chart with a plurality of waypoints, in accordance with some embodiments discussed herein.

FIG. 2 illustrates an example chart 200 with a plurality of waypoints 202 displayed overtop the chart 200. The plurality of waypoints 202 may be comprised of waypoints that were recorded at different times of day, seasons, tides, weather conditions, depths, or any other characteristic. Thus, each of the plurality of waypoints 202 may be associated with one or more waypoint characteristics, such as weather data, season data, time of day data, tide data, and/or depth data, among others. These associations can be made when a user creates the waypoint, or they can be altered any time after a waypoint is created. For example, a first waypoint 204 within the plurality of waypoints 202 may have waypoint characteristics that indicate optimal fishing in the morning, on a windy day, and in the winter. Alternatively, a second waypoint 206 of the plurality of waypoints 202 may have waypoint characteristics that indicate optimal fishing in the evening, on a calm day, and in the summer. Notably, while the first waypoint 204 and the second waypoint 206 are close in proximity on the chart 200, they are each associated with different conditions such that their presence together overtop the chart 200 could be misleading to a user.

Instead of having to view and decipher information from the plurality of waypoints 202, some embodiments provide a method of wayarea creation and management. That is, using user input, a system is provided that transforms the plurality of waypoints 202 into a useable interface/display. First, the plurality of waypoints 202 are, for example, filtered based on filtering characteristics obtained from the user, detected conditions (e.g., to find waypoints that are associated with the current conditions), or external network or database. Next, the filtered waypoints are grouped into wayareas based on a processor's suggestions, based on a user's input, or both. The wayareas are then saved to a memory so that the user can access and filter the wayareas later based on desired or detected conditions.

Figure 3:
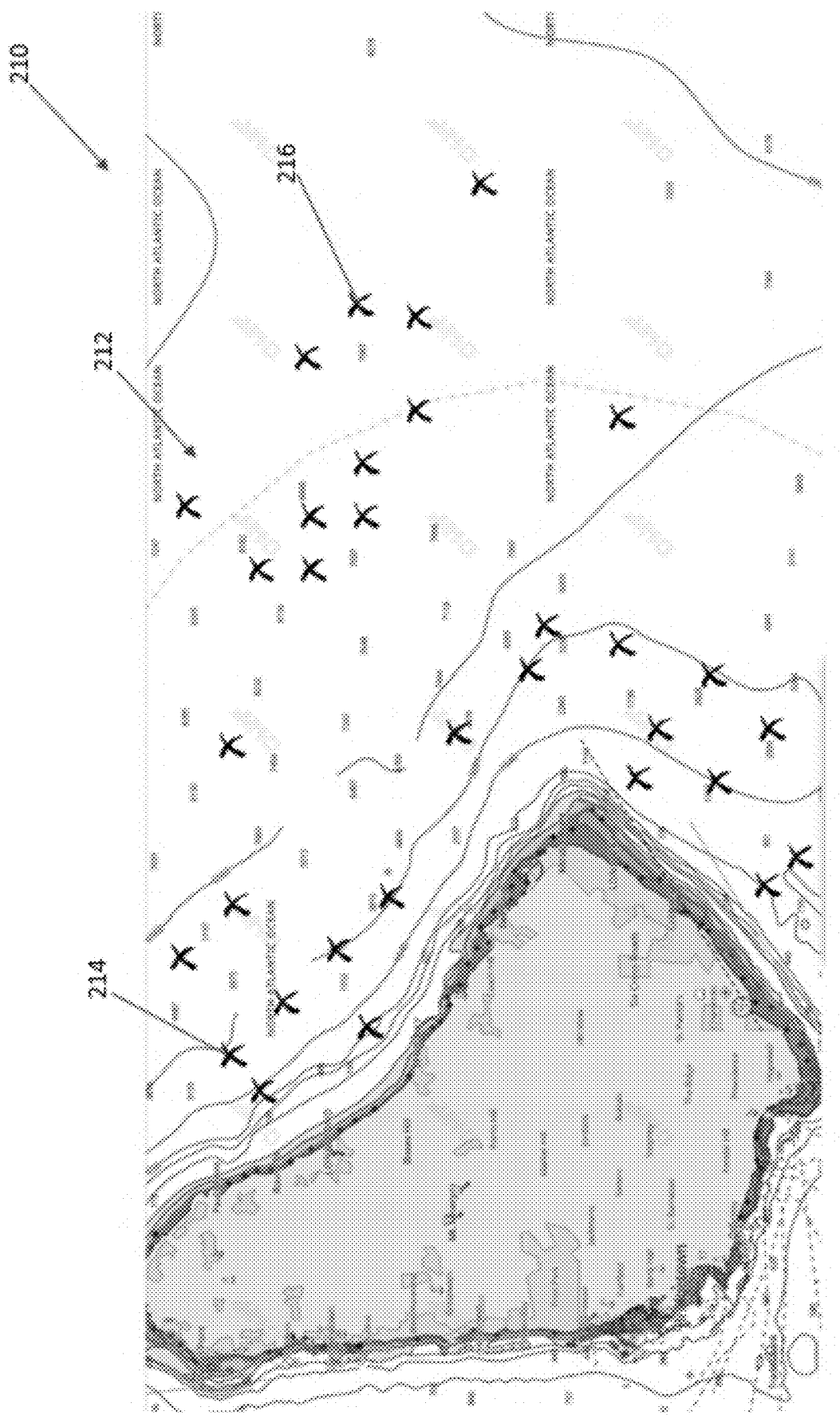
FIG. 3 shows the chart shown in FIG. 2 with a plurality of filtered waypoints, in accordance with some embodiments discussed herein.

FIG. 3 shows an example chart 210 with a plurality of filtered waypoints 212 displayed overtop the chart 210. The plurality of waypoints 202 from FIG. 2, for example, may be filtered based on criteria to form the illustrated plurality of filtered waypoints 212 in FIG. 3. In the illustration shown in FIG. 3, the plurality of filtered waypoints 212 were filtered based on each of the waypoints having optimal conditions in the morning and in the summer. For example, a first waypoint 214 of the plurality of filtered waypoints 212 may have waypoint characteristics that indicate optimal fishing in the morning, on a windy day, in the summer. Alternatively, a second waypoint 216 of the plurality of filtered waypoints 212 may have waypoint characteristics that indicate optimal fishing in the morning, on a calm day, in the summer.

To proceed from a display such as shown in FIG. 2 to a display such as shown in FIG. 3, a user may select one or more filtering characteristics. For example, in the examples shown in FIGS. 2-3, the user may have indicated a desire for fishing in the morning during the summer. In other embodiments, the one or more filtering characteristics that allow the system to proceed from a display such as shown in FIG. 2 to a display such as shown in FIG. 3 may be generated automatically based on detected current conditions. For example, one or more sensors may be used to detect current weather, depth, or tide conditions, among others, and/or the system may connect to a remote server or database to determine the current season and/or time of day. Those detected conditions may be used to filter the waypoints such that only those pertinent to the current conditions are shown.

Figure 4:
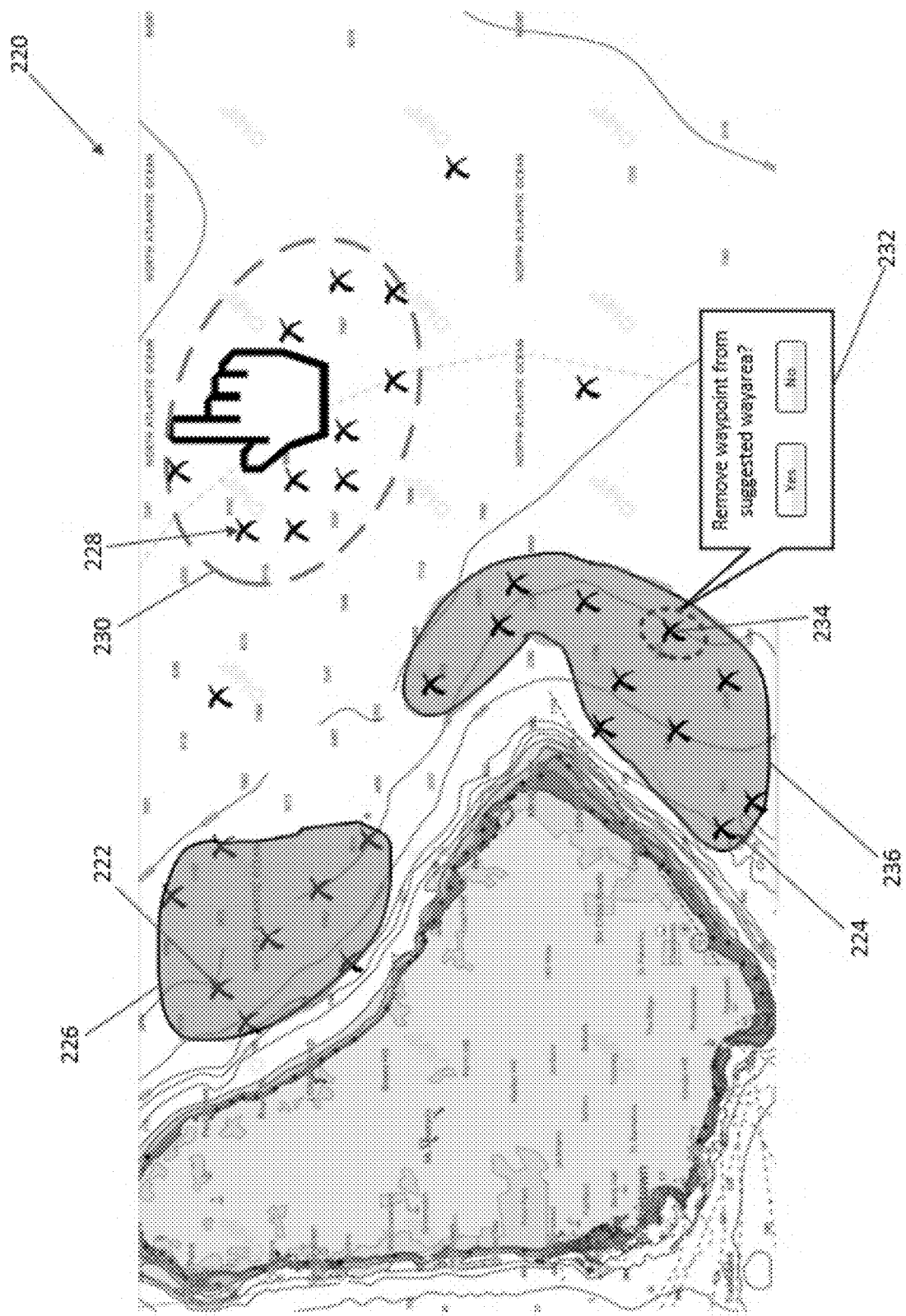
FIG. 4 shows the chart shown in FIG. 2 with suggested wayareas, in accordance with some embodiments discussed herein.

FIG. 4 shows an example chart 220 with suggested wayareas 226, 236 displayed overtop of the chart 220. The suggested wayareas 226, 236 enclose suggested waypoints 222, 224, respectively, which are portions of the plurality of filtered waypoints 212 shown in FIG. 3. The suggested waypoints 222, 224 are each grouped based on common waypoint characteristics and/or relative proximity. For example, the waypoints 222 in FIG. 4 share waypoint characteristics indicating optimal conditions in the morning, in windy conditions, and in the summer, and the waypoints 222 all have a relative proximity to each other that is under a predetermined threshold (e.g., within 1 mile, within 100 feet, within 200 feet, within 500 feet, within 1,000 feet, etc., although any distance threshold may be used). These parameters may be determined based on user input, based on current conditions, (measured using sensors and/or by connecting to a database/network), or using any other method. Similarly, the waypoints 224 in FIG. 4 share waypoint characteristics indicating optimal conditions in the morning, in calm weather conditions, and in the summer, and the waypoints 224 all have a relative proximity to each other that is under a predetermined threshold. These parameters may be determined based on user input, based on current conditions (e.g., measured using sensors or by connecting to a database/network), or using any other method. Once wayareas have been suggested to a user, such as suggested wayareas 226, 236, one or more of the suggested waypoints 222, 224 within those suggested wayareas 226, 236 may be modified (and the suggested wayareas may update accordingly). For example, the suggested waypoint 234 within suggested wayarea 232 may be removed using the popup box 232. If a user selects the "Yes" option in popup box 232, the suggested waypoint 234 will be removed and the suggested wayarea 232 will be updated to a new shape that no longer includes suggested waypoint 234. Similarly, although not shown, a user may be able to add a waypoint to a suggested wayarea (and the suggested wayarea will update accordingly).

Also shown in FIG. 4 is a plurality of waypoints 228 which are enclosed by a hand drawn wayarea 230. A wayarea may be hand drawn, as shown in FIG. 4, using touchscreen drawing, stylus drawing, or by any other method that allows user input of a shape. The hand drawn wayarea 230 may automatically snap into a closest suggested wayarea shape, or in some embodiments, the hand drawn wayarea 230 may be saved as the exact shape that was drawn by the user.

Additionally, although not shown in FIG. 4, wayareas may be suggested based on other information (e.g., information other than that related to pre-existing waypoints). For example, a wayarea may be suggested based on topography known to be advantageous for a certain type of fishing or other activity. As another example, wayareas may be suggested based on detected fishing patterns of one or more anglers (e.g., historical fishing patterns of the current angler and/or fishing patterns of other anglers, such as gathered from one or more remote servers). Some such example embodiments may provide a predictive assistive wayarea generation approach that can aid in an angler having a successful fishing trip. Similar concepts could be applicable to other marine activities as well, such as scuba diving, underwater investigations, anchoring, etc.

Figure 5:
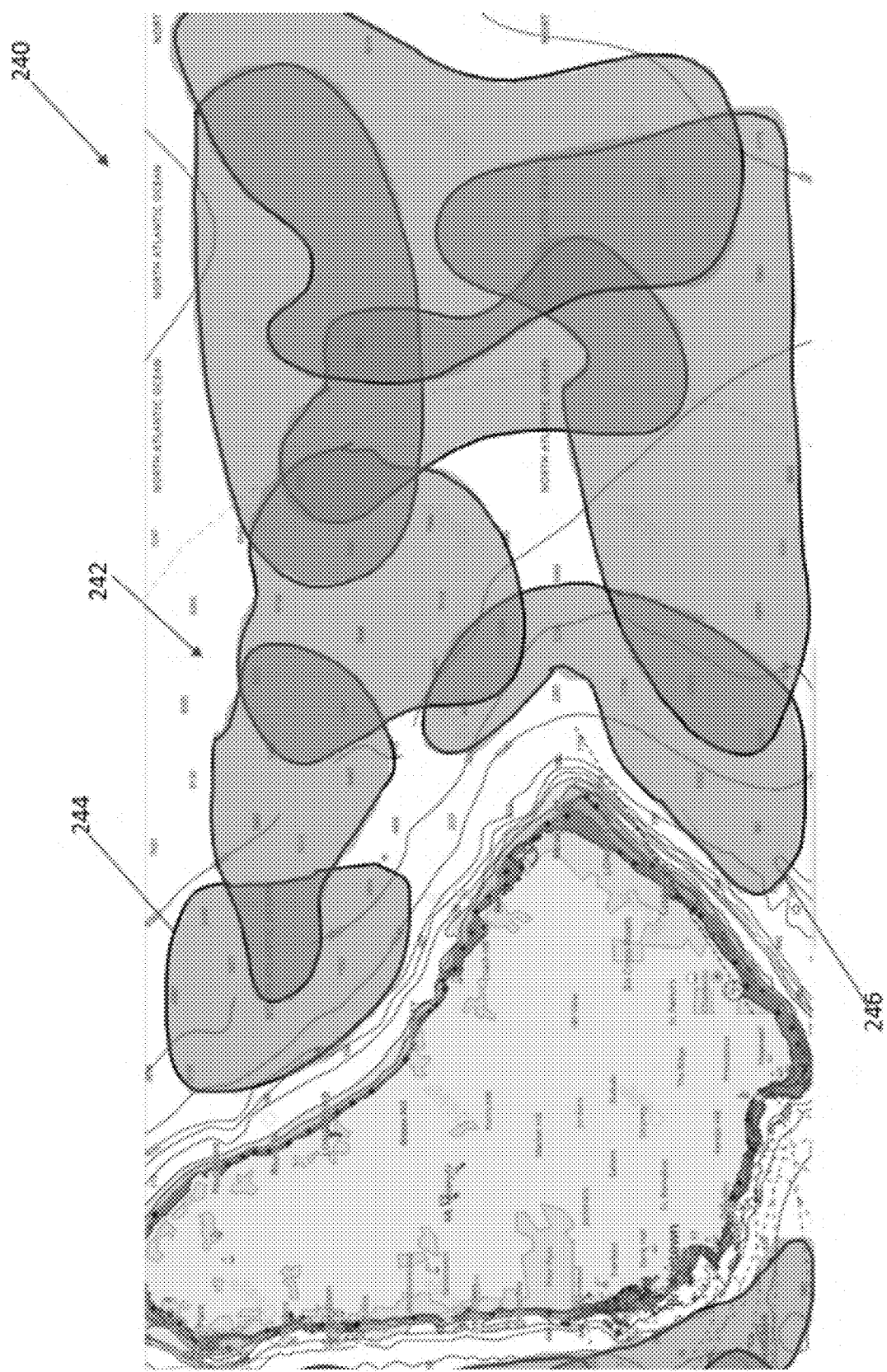
FIG. 5 shows the chart shown in FIG. 2 with a plurality of wayareas, in accordance with some embodiments discussed herein.

Once one or more wayareas have been created, the one or more wayareas may be saved, e.g., stored in memory, and associated with one or more wayarea characteristics. In this regard, the one or more wayareas that are stored may later be filtered by a user depending on desired conditions and/or detected current conditions. FIG. 5 shows an example chart 240 with a plurality of wayareas 242 displayed overtop the chart 240. Many of the plurality of wayareas 242 overlap, and each of the plurality of wayareas 242 has one or more wayarea characteristics. For example, a first wayarea 244 within the plurality of wayareas 242 has wayarea characteristics indicating ideal conditions in the morning, in windy conditions, and in the summer. Alternatively, a second wayarea 246 within the plurality of wayareas 242 has wayarea characteristics indicating ideal conditions in the morning, in calm weather conditions, and in the summer. Since many of the plurality of wayareas 242 may have differing wayarea characteristics, only some of the plurality of wayareas 242 may be helpful to a user at a certain point in time.

Figure 6:
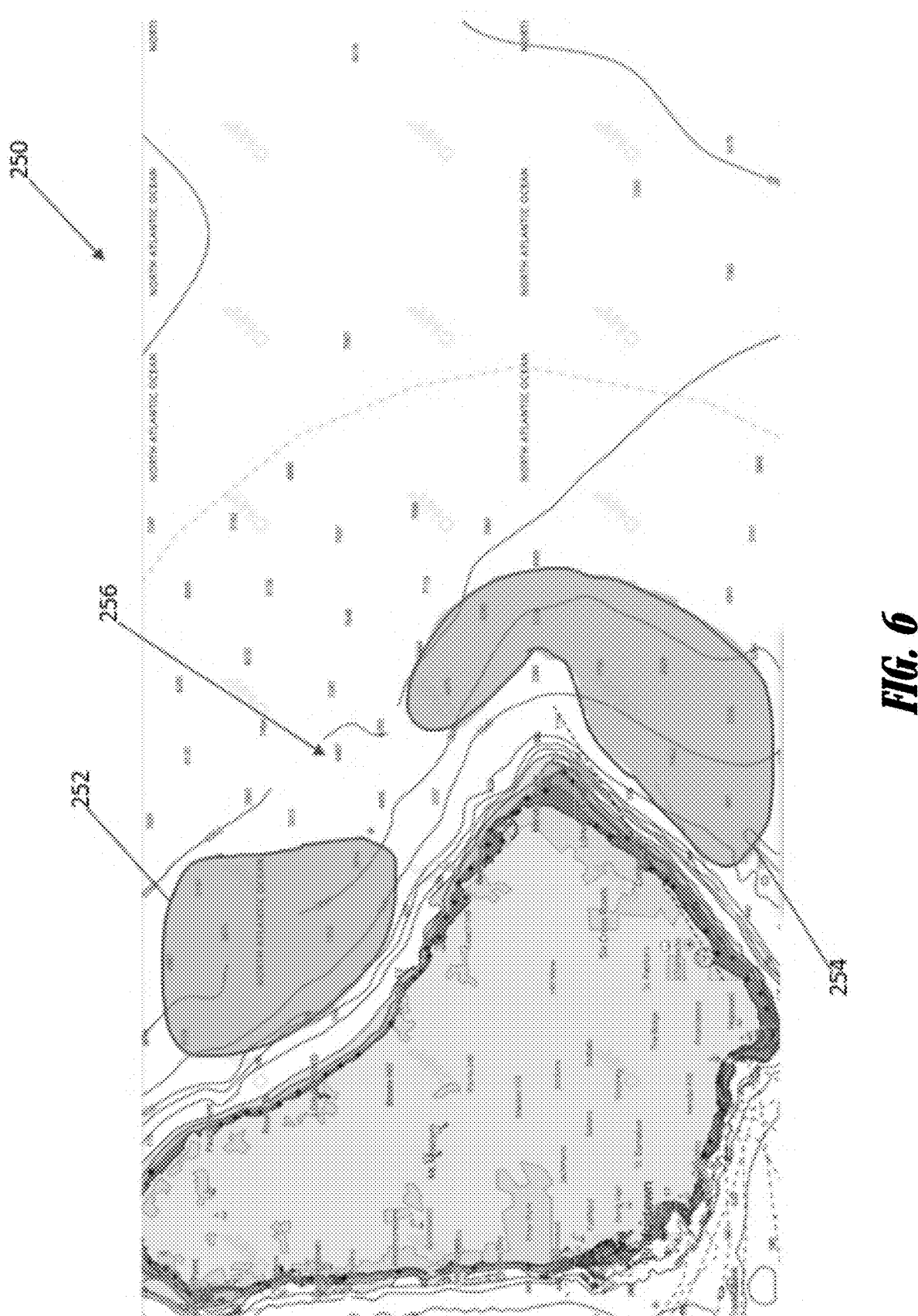
FIG. 6 shows the chart shown in FIG. 2 with filtered wayareas, in accordance with some embodiments discussed herein.

FIG. 6 shows an example chart 250 with a plurality of filtered wayareas 256 displayed overtop the chart 250. The plurality of wayareas 242 (shown in FIG. 5) may be filtered to form, e.g., the plurality of filtered wayareas 256 based on any criteria. In the illustration shown in FIG. 6, the plurality of filtered wayareas 256 were filtered based on each of the waypoints having optimal conditions in the morning and in the summer. For example, a first wayarea 252 of the plurality of filtered wayareas 256 may have wayarea characteristics indicating ideal conditions in the morning, in windy conditions, and in the summer. Alternatively, a second wayarea 254 within the plurality of wayareas 242 has the wayarea characteristics indicating ideal conditions in the morning, in calm weather conditions, and in the summer. The first wayarea 252 and the second wayarea 254 are then displayed to the user according to, e.g., detected or desired conditions. For example, the user may indicate that his/her desired weather condition is calm weather. Or the system may detect that the current weather is calm using a weather sensor or by connecting to a network to obtain current weather conditions. Based on either or both of these, the system may display the second wayarea 254 in a first type of highlighting (e.g., a green partially transparent form), indicating ideal weather conditions, and display the first wayarea 252 in a second type of highlighted (e.g., a red partially transparent form), indicating nonideal weather conditions. It still may be helpful to display the first wayarea 252, which is ideal in windy conditions, in case the weather changes during the user's fishing activity, or for any other reason. Alternatively, it may be helpful to remove certain wayareas altogether that may not be helpful at all to the user, such as wayareas that indicate ideal conditions in a different season.

Such settings may be pre-selected and/or customized by a user at any time. For example, in another embodiment, a user may desire to display wayareas that indicate ideal conditions in any season, but only in windy conditions. The resultant display may be wayareas that are highlighted differently based on ideal season. Moreover, in another embodiment, a user may desire to display wayareas that indicate ideal conditions in the spring season, in shallow depth conditions, in any weather condition, and in any tide condition. The resultant display may show all wayareas with ideal conditions in the spring and with shallow depth conditions. Those wayareas may then be highlighted differently according to ideal weather conditions, and the wayareas may be displayed with varying degrees of a highlighting (e.g., varying degrees of transparency, color, etc.) according to different ideal tide conditions. This may allow the user to easily change his/her strategy throughout the fishing day as weather and tide conditions change. Further, as the user discovers new information, he/she may easily be able to update the wayareas. For example, the user may discover that a certain wayarea is not only ideal in windy conditions, but also in calm weather conditions. Accordingly, the user may be able to quickly click the entire wayarea and update the ideal weather conditions from windy to both windy and calm.

Figure 7:
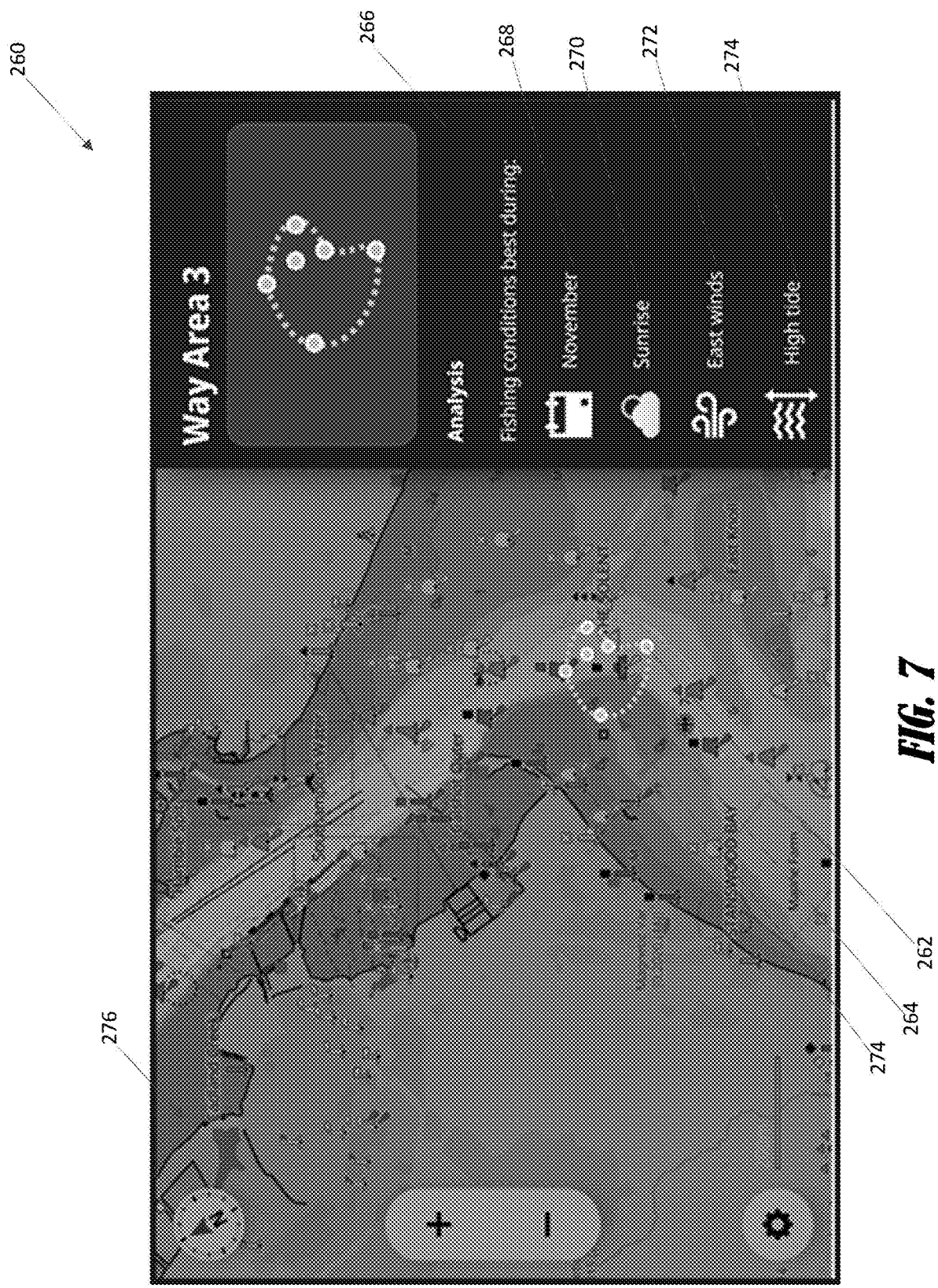
FIG. 7 shows an example user interface illustrating a wayarea overtop a chart, in accordance with some embodiments discussed herein.

FIG. 7 shows an example user interface 260 for displaying and/or modifying an example wayarea 274. For example, the user interface 260 may be used upon initial creation of the wayarea 274, or it may be used later when a user desires to modify the location, waypoints, or wayarea characteristics of the wayarea 274. The user interface 260 shows a depiction of the wayarea 274 as a dotted line 264 overtop a chart 276, and the waypoints within the wayarea 274 are depicted as dots 262. On the side of the user interface 260 is a pane 266 showing some of the wayarea characteristics of the wayarea 274. Specifically, the pane 266 displays the following wayarea characteristics: season or month data 268, time of day data 270, weather data 272, and tide data 274. In the user interface 260 shown in FIG. 7, a single best condition is shown for each of the wayarea characteristics. In other embodiments, multiple ideal conditions may be listed. For example, the tide data 274 may indicate "high tide and low tide," or the season or month data 268 may indicate "November through January." Further, the pane 266 may display other wayarea characteristics, such as depth data, or any other desired data.

Figure 8:
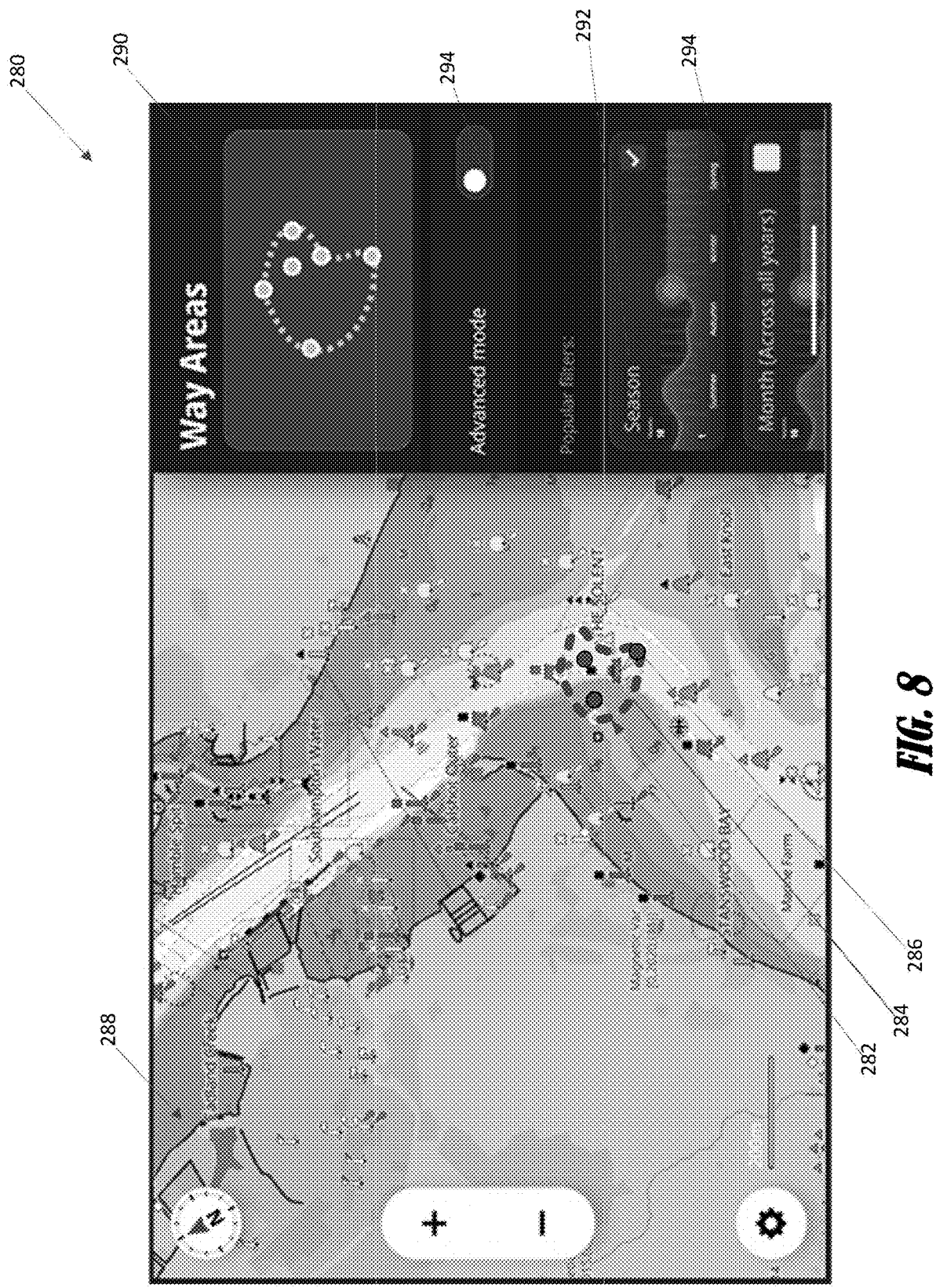
FIG. 8 shows another example user interface illustrating a wayarea overtop a chart, in accordance with some embodiments discussed herein.

FIG. 8 shows another example user interface 280 for displaying and/or modifying an example wayarea 282. For example, the user interface 280 may be used upon initial creation of the wayarea 282, or it may be used later when a user desires to modify the location, waypoints, or wayarea characteristics of the wayarea 282. The user interface 280 shows a depiction of the wayarea 282 as a dotted line 284 overtop a chart 288, and the waypoints within the wayarea 282 are depicted as dots 286. On the side of the user interface 280 is a pane 290 showing some of the wayarea characteristics of the wayarea 282. Specifically, the pane 290 displays the following wayarea characteristics: season data 292 and month data 294. In the user interface 280 shown in FIG. 8, graphical depictions of ideal and/or desired conditions are shown for each of the wayarea characteristics season data 292 and month data 294. For example, the season data 292 is displayed in graphical format, with the highest peaks corresponding to the seasons in which the wayarea has the most ideal conditions according to the wayarea's corresponding waypoints and the corresponding waypoint characteristics of those waypoints (which were used to create the wayarea). In other embodiments, graphical depictions of other wayarea characteristics may be listed. Further, in some embodiments, the graphical depictions may represent the data in a different way. For example, the pane 290 may include tide data that is displayed such that the highest peaks correspond to time(s) during a day when the tide is or is predicted to be the highest, and ideal conditions for fishing may be when the wayarea is experiencing a low tide. The advanced mode 294 may be used to enable a user to view data in more detail. For example, the data may be displayed as shown in FIG. 8 when the advanced mode 294 is turned off. Alternatively, when the advanced mode 294 is turned on, the user, for example, may be able to combine different graphical depictions of different wayarea characteristics into a single graphical depiction (e.g., the user may be able to view multiple wayarea characteristics in a single graphical depiction). In other embodiments, the advanced mode 294 may enable different features.

FIGS. 7-8 show example user interfaces for displaying and modifying wayareas. It should be appreciated that other user interfaces are contemplated, such as wayareas that display different information and in different formats. Along these lines, it is noted that while some example user interface interaction is shown and described with respect to a marine electronic device of a watercraft (e.g., a multi-function display), various example embodiments are usable on other devices, which may include devices that are utilized off water, such as back at a user's house for trip planning, etc.

Example System Architecture

FIG. 9 shows a block diagram of an example system 300 capable for use with various embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller) and various sensors/other systems.

The marine electronics device 302, controller, remote control, MFD, and/or user interface display may include a processor 306, a memory 308, a communication interface 310, a user interface 312, a display 314, and one or more sensors (e.g., other sensors 316 which may be in the marine electronics device 302 or otherwise operatively connected (e.g., wired or wirelessly)).

In some embodiments, the system 300 may be configured to receive, process, and display various types of marine data. Additionally, the system 300 may include one or more components that are configured to gather marine data or perform marine features. In such a regard, the processor 306 may be configured to process the marine data and generate one or more images corresponding to the marine data for display on the screen that is integrated in the marine electronics device 302. Further, the system 300 may be configured to communicate with various internal or external components (e.g., through the communication interface 310), such as to provide instructions related to the marine data.

The processor 306 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 306 as described herein. In this regard, the processor 306 may be configured to analyze electrical signals communicated thereto to provide display data to the display.

The memory 308 may be configured to store instructions, computer program code, marine data (e.g., sonar data, chart data, location/position data, sensor data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 310 may form a processing circuitry/communication interface. The communication interface 310 may be configured to enable connections to external systems (e.g., an external network 318 or one or more remote controls, such as a handheld remote control, marine electronics device, foot pedal, or other remote computing device). In this regard, the communication interface (e.g., 310) may include one or more of a plurality of different communication backbones or frameworks, such as Ethernet, USB, CAN, NMEA 2000, GPS, Sonar, cellular, WiFi, and/or other suitable networks, for example. In this manner, the processor 306 may retrieve stored data from a remote, external server via the external network 318 in addition to or as an alternative to the onboard memory 308. Numerous other peripheral, remote devices such as one or more wired or wireless multi-function displays may be connected to the system 300.

The processor 306 may configure the device and/or circuitry to perform the corresponding functions of the processor 306 as described herein. In this regard, the processor 306 may be configured to analyze electrical signals communicated thereto to provide, for example, various features/functions described herein.

In some embodiments, the system 300 may be configured to determine the location of the marine vessel, such as through a location sensor 324. The system 300 may comprise, or be associated with, a navigation system that includes the location sensor 324. For example, the location sensor 324 may comprise a GPS, bottom contour, inertial navigation system, such as a micro-electro-mechanical system (MEMS) sensor, a ring laser gyroscope, or the like, or other location detection system. In such a regard, the processor 306 may be configured to act as a navigation system. For example, the processor 306 may generate at least one waypoint and, in some cases, generate an image of a chart along with the waypoint for display by the screen. Additionally or alternatively, the processor 306 may generate one or more routes associated with the watercraft. The location of the vessel, waypoints, wayareas, and/or routes may be displayed on a navigation chart on a display remote from the system 300. Further, additional navigation features (e.g., providing directions, weather information, etc.) are also contemplated.

In any of the embodiments, the display 314 may be configured to display an indication of the current direction of the marine vessel.

The display 314 may be configured to display images and may include or otherwise be in communication with a user interface 312 configured to receive input from a user. The display 314 may be, for example, a conventional liquid crystal display (LCD), LED/OLED display, touchscreen display, mobile media device, and/or any other suitable display known in the art, upon which images may be displayed. In some embodiments, the display 314 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 314 may present one or more sets of marine data and/or images generated therefrom. Such marine data may include chart data, radar data, weather data, location data, position data, orientation data, sonar data, and/or any other type of information relevant to the marine vessel. In some embodiments, the display 314 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 314 and/or user interface 312 may be a screen that is configured to merely present images and not receive user input. In other embodiments, the display and/or user interface may be a user interface such that it is configured to receive user input in some form. For example, the screen may be a touchscreen that enables touch input from a user. Additionally or alternatively, the user interface may include one or more buttons (not shown) that enable user input.

Additionally, the display 314 may be configured to display other relevant information including, but not limited to, speed data, motor data battery data, current operating mode, auto pilot, or the like. For example, in some example embodiments, the system 300 may include a wayarea navigation mode. The processor 306 may receive an indication of the current location of the watercraft and the current and/or desired conditions of the environment and generate display data accordingly. In an example embodiment, the generated display data may be manipulated by user input. For example, the processor 306 may receive data from the user input device 304, the location sensor 324, the external network 318, and/or the other sensors 316. The received data may comprise user input indicating a plurality of desired conditions. Additionally, or alternatively, the received data may comprise information regarding current conditions of the surrounding environment, such as the current season, the current weather, or the current location, among other conditions. The processor 306 may then use the received data to filter waypoints and suggest wayareas to the user. Additionally, or alternatively, the processor 306 may use the received data to filter already existing wayareas for display to the user.

The user interface 312 may include, for example, a keyboard, keypad, function keys, mouse, scrolling device, input/output ports, touch screen, or any other mechanism by which a user may interface with the system.

In some embodiments, the system 300 further includes a power source (e.g., battery) that is configured to provide power to the various components. In some embodiments, the power source is rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 306 may receive battery data from the battery sensor and determine the remaining charge on the battery. In an example embodiment, the voltage or current measured by the battery sensor may be compared to a reference value or data table, stored in memory 308, to determine the remaining charge on the battery.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hard-wired links, wireless links, or combinations thereof). In a distributed computing environment, program modules may be located in both local and remote computer storage media including memory storage devices.

The system 300 may include a computer device or system 322 (e.g., mobile media device) into which implementations of various technologies and techniques described herein may be implemented. Computing device 322 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 322.

The other sensors/systems 316 may be any other marine sensor or system, such as described herein. Examples of various other sensors/system 316 include one or more sonar systems, one or more radar systems, an autopilot, a trolling motor, main propulsion motor(s), pressure sensor, temperature sensor, or other devices utilized in a marine environment.

Example Flowchart(s)

Embodiments of the present disclosure provide methods for assisting the user with creating and managing wayareas associated with a marine vessel. Various examples of the operations performed in accordance with embodiments of the present disclosure will now be provided with reference to FIGS. 10-11.

Figure 10:
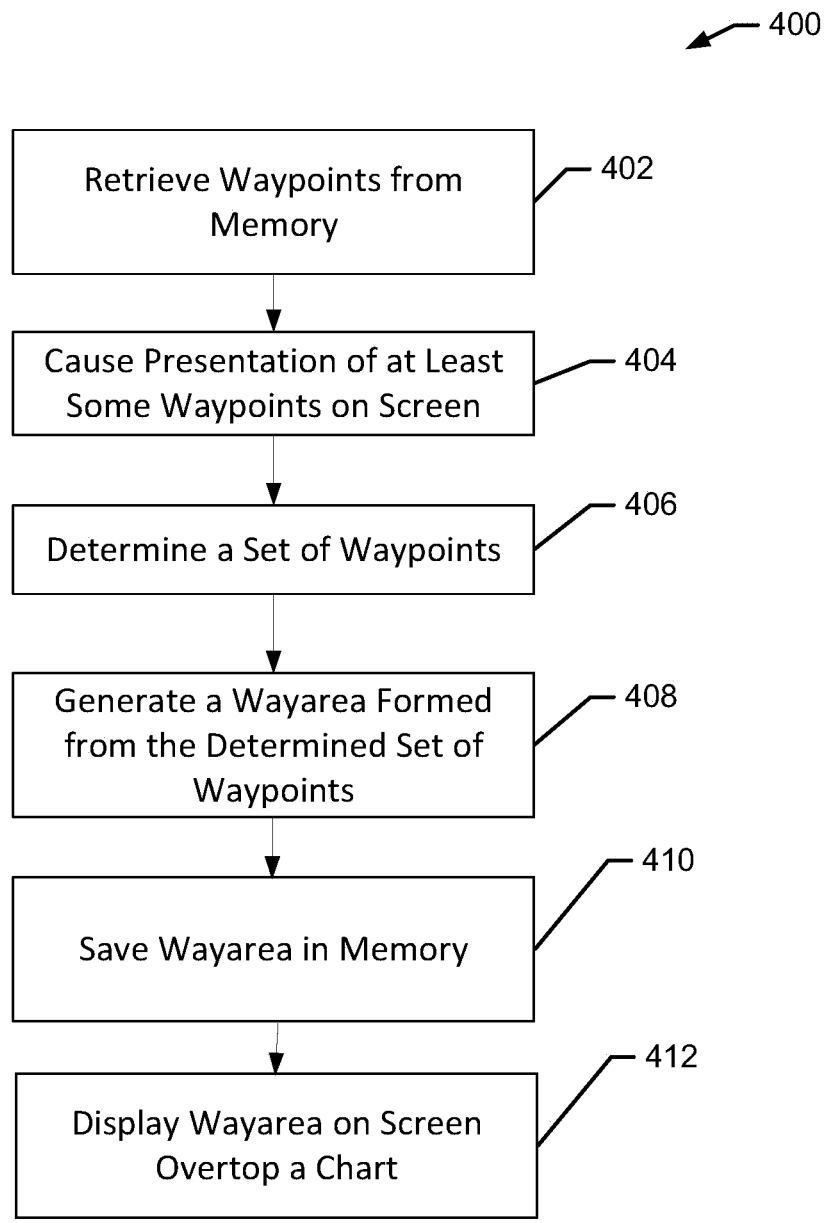
FIG. 10 shows an example method for generating a wayarea, in accordance with some embodiments discussed herein.

FIG. 10 shows an example method 400 for forming wayareas for a watercraft. The method 400 may include, at 402, retrieving waypoints from a memory. At 404, the method may include causing presentation of at least some waypoints on a screen. At 406, the method may include determining a set of waypoints. For example, the set of waypoints may be determined by filtering the waypoints to determine the set of waypoints having one or more filtering characteristics. Additionally or alternatively, the set of waypoints may be determined based on user input. At 408, the method may include generating a wayarea formed from the determined set of waypoints. For example, the wayarea may be generated automatically, or it may be generated based on user input. At 410, the method may include saving the wayarea in the memory. At 412, the method may include displaying the wayarea overtop a chart.

Figure 11:
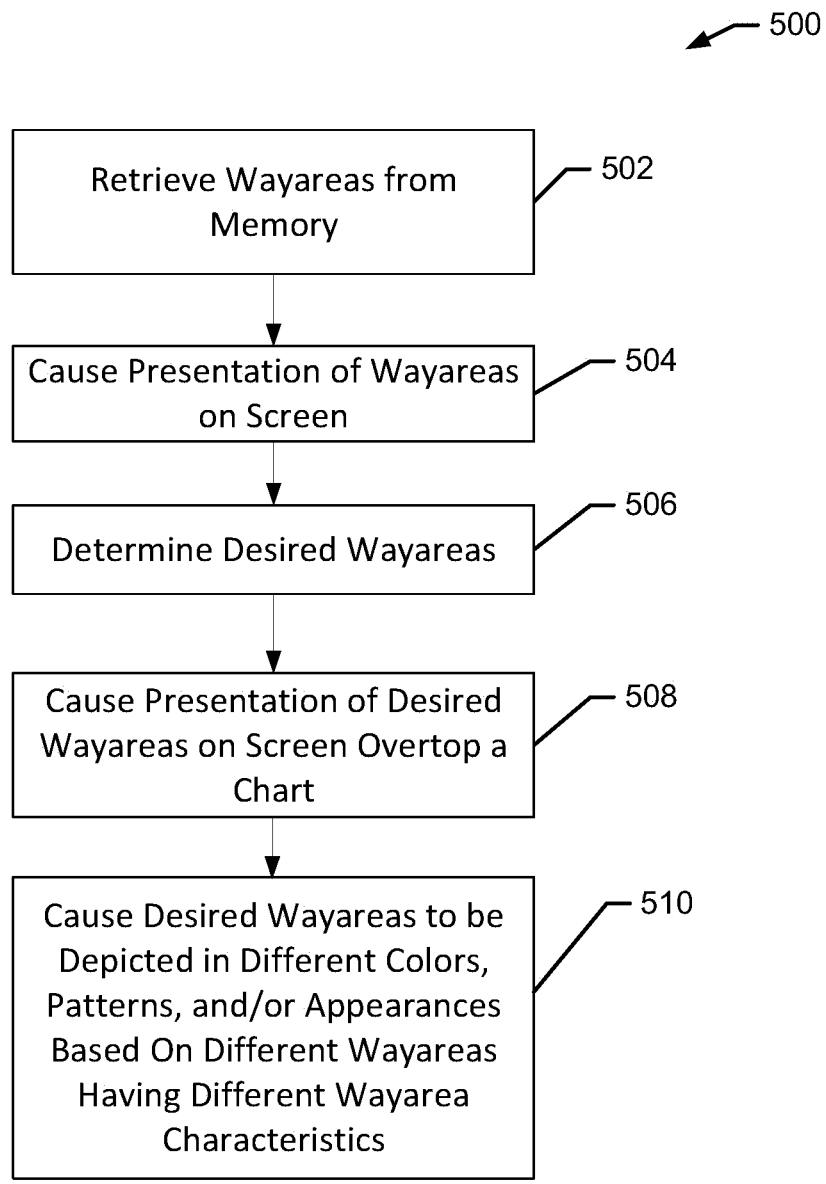
FIG. 11 shows an example method for managing wayareas, in accordance with some embodiments discussed herein.

FIG. 11 shows an example method 500 for displaying wayareas on a screen of a marine electronic device. At 502, the method may include retrieving wayareas from a memory. At 504, the method may include causing presentation of wayareas on a screen. At 506, the method may include determining desired wayareas. For example, the desired wayareas may be determined by filtering the wayareas based on one or more filtering characteristics. Additionally or alternatively, the desired wayareas may be determined automatically based on detected current conditions. At 508, the method may include causing presentation of the desired wayareas on the screen overtop a chart. At 510, the method may include causing the desired wayareas to be depicted in different colors, patterns, and/or appearances based on different wayareas having different wayarea characteristics.

FIGS. 10-11 illustrate flowcharts of a system, method, and/or computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 308 and executed by, for example, the processor 306 or controller. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating various marine devices may include additional, optional operations, and/or the operations described above may be modified or augmented.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for forming wayareas for a watercraft, the system comprising:
 a screen;
 a processor; and
 a memory including computer executable instructions, the computer executable instructions configured to, when executed by the processor, cause the processor to:
  retrieve a plurality of waypoints from the memory, wherein each of the plurality of waypoints is associated with a location and one or more waypoint characteristics, wherein the one or more waypoint characteristics comprise at least one of:
   weather data corresponding to weather conditions associated with the waypoint,
   season data corresponding to a season associated with the waypoint,
   time of day data corresponding to one or more times of day associated with the waypoint,
   tide data corresponding to tide conditions associated with the waypoint, or
   depth data corresponding to a depth of a bottom surface at the location of the waypoint;
  cause presentation of at least some of the plurality of waypoints on the screen;
  determine, based on a first user input indicating a desire to form a wayarea, a set of waypoints from the plurality of waypoints based on at least one of:
   second user input indicating one or more selected waypoint characteristics and filtering the plurality of waypoints to determine the set of waypoints within the plurality of waypoints having the one or more selected waypoint characteristics, or
   third user input selecting each waypoint in the set of waypoints;
  generate the wayarea formed from the determined set of waypoints, wherein the wayarea establishes a location area that includes all of the locations of each of the waypoints within the determined set of waypoints;
  save the wayarea in the memory; and
  cause the wayarea to be displayed overtop a chart on the screen, wherein the wayarea is presented as a highlighted section of the chart in replacement of the determined set of waypoints, wherein the highlighted section of the chart corresponds to the location area that had included all of the locations of each of the waypoints within the determined set of waypoints.

2. The system of claim 1, wherein the one or more selected waypoint characteristics include at least one of the weather data, the season data, the time of day data, the tide data, or the depth data.

3. The system of claim 1, wherein the one or more selected waypoint characteristics are determined based on current conditions, and wherein the current conditions are determined by collecting information from at least one of a sensor, a database, or a server.

4. The system of claim 1, wherein the one or more selected waypoint characteristics are determined based on a selected type of fishing.

5. The system of claim 1, wherein the generated wayarea is stored in the memory in a manner that associates at least some of the one or more waypoint characteristics of each of the waypoints within the determined set of waypoints with the wayarea.

6. The system of claim 1, wherein the set of waypoints that is determined from the plurality of waypoints have a relative distance to each other that satisfies a predetermined threshold.

7. The system of claim 6, wherein the predetermined threshold is 200 feet or less.

8. The system of claim 1, wherein weather data includes at least one of cloud data, sun data, moon data, precipitation data, or temperature data.

9. The system of claim 1, wherein the weather conditions are desirable weather conditions corresponding to an activity.

10. The system of claim 1, wherein the weather conditions are captured conditions when the waypoint was generated.

11. The system of claim 1, wherein the third user input selecting the waypoints includes user input indicating a hand drawn shape overtop a chart, and wherein the set of waypoints that is determined each have location data corresponding to locations within the hand drawn shape on the chart.

12. A method for forming wayareas for a watercraft, the method comprising:
retrieving a plurality of waypoints from a memory, wherein each of the plurality of waypoints is associated with a location and one or more waypoint characteristics, wherein the one or more waypoint characteristics comprise at least one of:
weather data corresponding to weather conditions associated with the waypoint,
season data corresponding to a season associated with the waypoint,
time of day data corresponding to one or more times of day associated with the waypoint,
tide data corresponding to tide conditions associated with the waypoint, or
depth data corresponding to a depth of the bottom surface at the location of the waypoint;
causing presentation of at least some of the plurality of waypoints on the screen;
determining, based on a first user input indicating a desire to form a wayarea, a set of waypoints from the plurality of waypoints based on at least one of:
second user input indicating one or more selected waypoint characteristics and filtering the plurality of waypoints to determine the set of waypoints within the plurality of waypoints having the one or more selected waypoint characteristics, or
third user input selecting each waypoint in the set of waypoints;
generating the wayarea formed from the determined set of waypoints, wherein the wayarea establishes a location area that includes all of the locations of each of the waypoints within the determined set of waypoints;
saving the wayarea in the memory; and
causing the wayarea to be displayed overtop a chart on the screen, wherein the wayarea is presented as a highlighted section of the chart in replacement of the determined set of waypoints, wherein the highlighted section of the chart corresponds to the location area that had included all of the locations of each of the waypoints within the determined set of waypoints.

13. The method of claim 12, wherein the one or more selected waypoint characteristics include at least one of the weather data, the season data, the time of day data, the tide data, or the depth data.

14. The method of claim 12, wherein the one or more selected waypoint characteristics are determined based on current conditions, and wherein the current conditions are determined by collecting data from at least one of a sensor, a database, or a server.

15. The method of claim 12, wherein the one or more selected waypoint characteristics are determined based on a selected type of fishing.

16. The method of claim 12, wherein the third user input selecting the waypoints includes user input indicating a hand drawn shape overtop a chart, and wherein the set of waypoints that is determined each have location data corresponding to locations within the hand drawn shape on the chart.

17. A non-transitory computer readable medium having stored thereon computer instructions that, when executed by a processor, cause the processor to:
retrieve a plurality of waypoints from a memory, wherein each of the plurality of waypoints is associated with a location and one or more waypoint characteristics, wherein the one or more waypoint characteristics comprise at least one of:
weather data corresponding to weather conditions associated with the waypoint,
season data corresponding to a season associated with the waypoint,
time of day data corresponding to one or more times of day associated with the waypoint,
tide data corresponding to tide conditions associated with the waypoint, or
depth data corresponding to a depth of the bottom surface at the location of the waypoint;
cause presentation of at least some of the plurality of waypoints on the screen;
determine, based on a first user input indicating a desire to form a wayarea, a set of waypoints from the plurality of waypoints based on at least one of:
second user input indicating one or more selected waypoint characteristics and filtering the plurality of waypoints to determine the set of waypoints within the plurality of waypoints having the one or more selected waypoint characteristics, or
third user input selecting each waypoint in the set of waypoints;
generate the wayarea formed from the determined set of waypoints, wherein the wayarea establishes a location area that includes all of the locations of each of the waypoints within the determined set of waypoints; and
save the wayarea in the memory; and
cause the wayarea to be displayed overtop a chart on the screen, wherein the wayarea is presented as a highlighted section of the chart in replacement of the determined set of waypoints, wherein the highlighted section of the chart corresponds to the location area that had included all of the locations of each of the waypoints within the determined set of waypoints.

* * * * *